US011245351B2

(12) United States Patent
Milder et al.

(10) Patent No.: US 11,245,351 B2
(45) Date of Patent: Feb. 8, 2022

(54) POWER GENERATION SOURCE AND DISTRIBUTION SYSTEM

(71) Applicant: AMENERGY, Inc., Santa Fe, NM (US)

(72) Inventors: Fredric L Milder, Galisteo, NM (US); Peter Page, Corrales, NM (US); Mark Howell, Santa Fe, NM (US)

(73) Assignee: Amenergy, Inc., Santa Fe, NM (US)

( * ) Notice: Subject to any disclaimer, the term of this patent is extended or adjusted under 35 U.S.C. 154(b) by 0 days.

(21) Appl. No.: 16/596,185

(22) Filed: Oct. 8, 2019

(65) Prior Publication Data

US 2020/0119683 A1   Apr. 16, 2020

Related U.S. Application Data

(60) Provisional application No. 62/743,856, filed on Oct. 10, 2018.

(51) Int. Cl.
*H02S 10/20* (2014.01)
*H02S 10/10* (2014.01)
(Continued)

(52) U.S. Cl.
CPC ........... *H02S 10/20* (2014.12); *H01M 10/465* (2013.01); *H02S 10/10* (2014.12); *H02S 10/40* (2014.12); *H01M 2220/10* (2013.01)

(58) Field of Classification Search
CPC .......... H02S 10/20; H02S 10/40; H02S 10/10; H01M 10/465; H01M 2220/10;
(Continued)

(56) References Cited

U.S. PATENT DOCUMENTS 6,299,008 B1 * 10/2001 Payne ................. B65D 88/121
220/1.5
10,219,447 B1 * 3/2019 DeCarli ................... A01G 9/16
(Continued)

FOREIGN PATENT DOCUMENTS

CN    202603396 U    12/2012
CN    105145455 A    12/2015
WO    2016154360 A1    9/2016

OTHER PUBLICATIONS

Farmpod, FarmPod: Revolutionizing Relationships with Food; consisting of 9-pages.
(Continued)

*Primary Examiner* — Tae-Sik Kang
(74) *Attorney, Agent, or Firm* — Christopher & Weisberg, P.A.

(57) ABSTRACT

A renewable-energy electrical generation and distribution system including a container. At least one power source is sized to be retained within the container and deployable therefrom, the at least one power source being configured to generate energy from renewable resources. A battery is disposed within the container and in communication with the at least one power source. A power distribution system is disposed within the container and in communication with the battery and the at least one power source, the power distribution system including: at least one switch and at least one interface connected to the at least one switch and disposed external to the container, the at least one switch configured selectively turn on and off power distribution to the at least one interface based on at least one predetermined parameter.

19 Claims, 8 Drawing Sheets

(51) Int. Cl.
*H01M 10/46* (2006.01)
*H02S 10/40* (2014.01)

(58) Field of Classification Search
CPC ............ H01M 2220/30; H01M 10/48; H01M 10/425; H01M 10/44; Y02E 60/10; Y02E 10/50; Y02E 70/30
See application file for complete search history.

(56) References Cited

U.S. PATENT DOCUMENTS

| | | | |
|---|---|---|---|
| 2009/0179495 A1* | 7/2009 | Yeh | H02S 10/10 307/66 |
| 2010/0229919 A1 | 9/2010 | Benatar | |
| 2010/0267406 A1* | 10/2010 | Srinivasan | H04H 20/30 455/509 |
| 2011/0020676 A1* | 1/2011 | Kurosawa | H01M 10/653 429/62 |
| 2011/0146751 A1 | 6/2011 | McGuire et al. | |
| 2013/0008386 A1 | 1/2013 | Jacobs | |
| 2013/0234645 A1* | 9/2013 | Goei | H02J 7/35 320/101 |
| 2014/0238467 A1 | 8/2014 | Martin et al. | |
| 2015/0245569 A1 | 9/2015 | Villamar | |
| 2017/0222598 A1* | 8/2017 | Campbell | E04B 1/34384 |
| 2017/0325427 A1 | 11/2017 | Straight et al. | |

OTHER PUBLICATIONS

International Search Report and Written Opinion dated Jul. 31, 2017 for International Application No. PCT/US2017/032182, filed on May 11, 2017; consisting of 27-pages.

* cited by examiner

POWER GENERATION SOURCE AND DISTRIBUTION SYSTEM

CROSS-REFERENCE TO RELATED APPLICATION

This application is related to and claims priority to U.S. application Ser. No. 62/743,856, filed Oct. 10, 2018, the entirety of which is incorporated herein by reference.

FIELD

This disclosure relates to power generation source and distribution system, and in particular, a container configured to generate renewable energy, distribute the generated energy to one or more energy access points, and maintain its equilibrium and functionality in a plurality of weather conditions.

BACKGROUND

During or in the aftermath of adverse weather events, such as hurricanes, earthquakes, tornadoes, and floods, conventional power generation systems, and the infrastructure to deliver the generated power to homes and business, are typically rendered inoperable for days, weeks, or even months. For example, during Hurricane Maria, most of Puerto Rico's electrical grid was damaged, and as a result most of the island was out power for months. While primary recovery efforts in Puerto Rico were focused on delivering fuel to power portable generators, many of the ports were inaccessible and the roads were impassable, thus rendering portable diesel generators useless.

SUMMARY

Some embodiments advantageously provide for a renewable-energy electrical generation and distribution system including a container and at least one power source sized to be retained within the container and deployable therefrom. The at least one power source being configured to generate energy from renewable resources. A battery is disposed within the container and in communication with the at least one power source. A power distribution system is disposed within the container and in communication with the battery and the at least one power source. The power distribution system includes at least one switch and at least one interface connected to the at least one switch and disposed external to the container. The at least one switch is configured selectively turn on and off power distribution to the at least one interface based on at least one predetermined parameter. A power source controller is disposed within the container and configured to monitor and control energy absorption from the at least one power source, energy storage in the battery, and energy delivery to the power distribution system. An environmental control unit is disposed within the container and in communication with the ambient environment external to the container, the environmental control unit is configured to monitor and control a predetermined environmental condition within the container.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components related to generating and distributing off-grid power in a portable container. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 1:
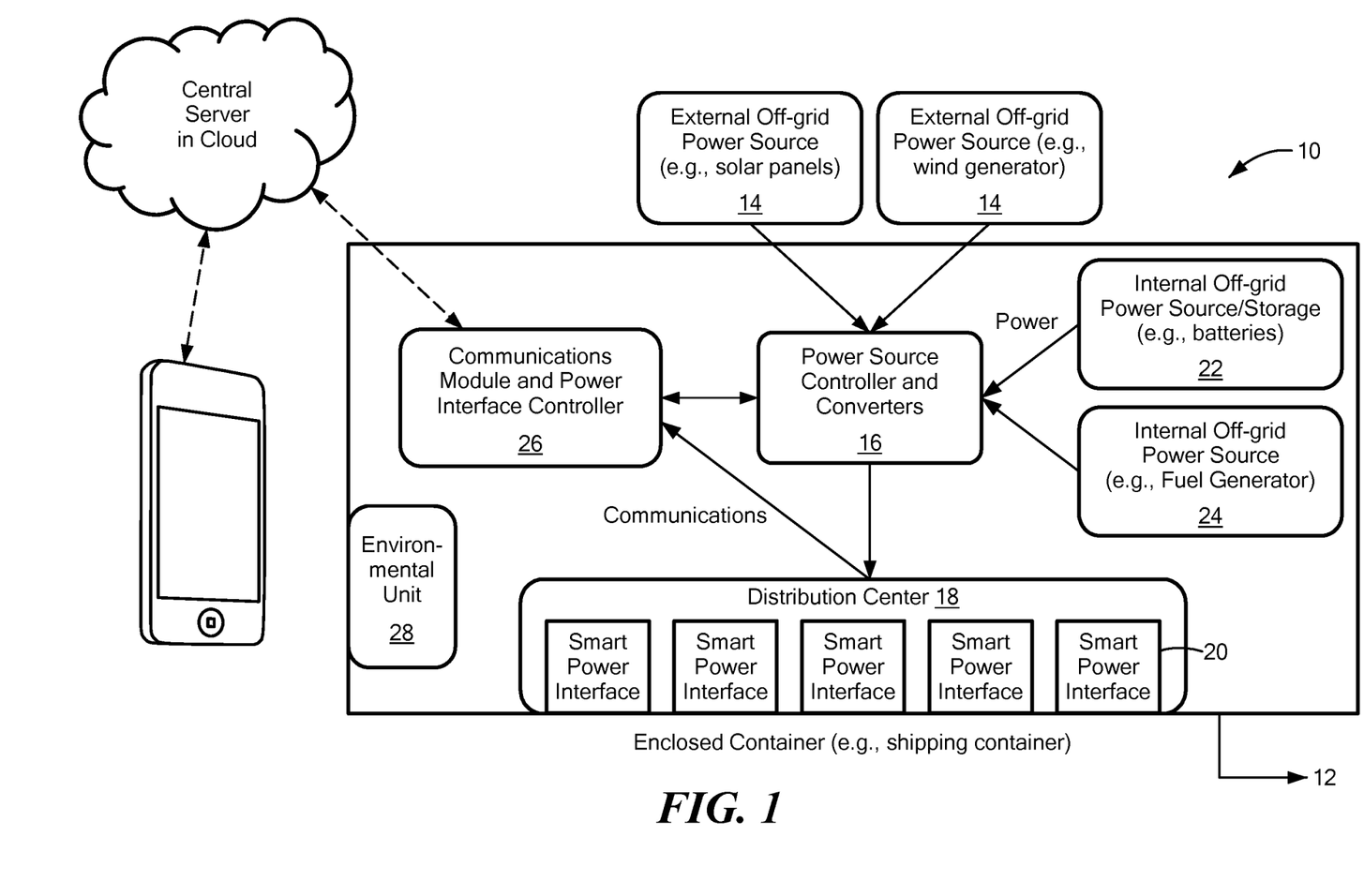
FIG. 1 is a block diagram showing various components of a power generation source and distribution system associated with a container and constructed in accordance with the principles of the present application.

Referring now to the drawing in which like reference designators refer to like elements, there is shown in FIG. 1 an exemplary power generator source and distribution system constructed in accordance with the principles of the present application and designated generally as "10." The system 10 may be disposed within a container 12, for example, a shipping container, sized and configured to house and enclose all the components of the system and to facilitate the shipping and deployment of the various components discussed herein preceding, during, and in the aftermath of a severe weather event. In one configuration, the container 12 may be a hollowed-out shipping container having corrugated metal walls, but may also be a made-to-order container. Mounted, stacked, or otherwise retained within the container 12 are one or more renewable and off-grid power sources 14, for example, a solar panel array, wind generator, or the like. The power sources 14 may be deployable from within the container 12 to a position external to the container 12 and are in communication with a power source controller 16 having a processor having processing circuitry configured to control operation of the power sources 14 and to convert and distribute power generated from the power sources 14 to a power distribution center 18. For example, power generated from the power sources may be converted from whatever the power sources 14 produce to conventional 120/240/480 50/60 HZ VAC and 5 VDC (e.g., USB compatible). The distribution center 18 may include a plurality of smart power interfaces 20 for one or more users to access the generated power external to the container 12. In an exemplary configuration, each smart power interface 20 may include one or more power outlets (not shown), a power distribution indicator (not shown), a timer (not shown), and/or a payment terminal (not shown) that face outward from the container 12 such that they are accessible by users. In one configuration, each smart power interface 20 is selectable, for example, by the user, via the Internet, a remote station, and/or internal systems of the container 12 such that each smart power interface 20 may be turned on or off on demand and/or its power usage monitored.

Continuing to refer to FIG. 1, the system 10 may further include a battery 22 and an internal power generator 24 to function as an alternative power source should the power sources 14 be unavailable, unusable, or inoperable. For example, the battery 22 may be charged by the power sources 14 and/or the generator 24 for use when the power sources 14 are unavailable, for example, at night when the power source 14 is a solar panel array, and may be used to provide power to the power distribution center 18 by the power source controller 16. A communication system 26 may also be sized to be retained within the container 12 and configured to communicate with users and other containers 12, as discussed in more detail below. For example, the communication system 26 may include a processor having processing circuity and a radio in communication with the processor configured to transmit and receive instructions to and from users and/or a cloud-based server. The communication system 26 may receive power from the power source controller 16, and thus may be active whether power sources 14 are available or not. In an exemplary configuration, a user may request to access power from the container 12 by either directly accessing a control panel (not shown) or a mobile application which communications with the could-based server or directly with the communication system 26 to provide access to a smart power interface 20. Such access may be given away for free or through a payment, which may provide a predetermined amount of power to each smart power interface 20. For example, during an adverse weather event, authorized users may request access to the system 10 and be assigned a particular smart power interface 20 from which they may draw power. Such access may be limited in time and power, depending on the available power of the system 10, the number of users drawing power from the system 10, the time of the day, or other factors that the power source controller 16 may be pre-programmed to process.

Continuing to refer to FIG. 1, the system 10 may include an environmental control unit 28 configured to, among other things, control the environment within the container 12. For example, the container 12 may be deployed in off-grid areas that may experience extreme heat, cold, humidity, and dryness. Any of those conditions could be problematic for the electric components of system 10 and/or the power sources 14. Accordingly, the environmental control unit 28 may include an air conditioning system, humidity control unit, and/or a heating element, and the like, with associated vents, louvers, heat sinks, and the like to maintain a predetermine environmental condition within the interior of the container 12. In the configuration shown in FIG. 1, the environmental control unit 28 is mounted to a wall of the container 12 and receives power from the power source controller 16 and also communicates with the power distribution center 18. In one configuration, the power source control 16 monitors the temperature within the container 12 and/or the temperature of the electronics components, and may prioritize power to the distribution center 18 if the environmental control unit 28 does not need to be operational, for example, in an ambient environment that is within a range of predetermined operational parameters from the components of the system 10. In other configurations, the power source controller 16 may prioritize power to the environmental control unit 28 when ambient conditions, whether heat, cold, or humidity are outside the range of acceptable parameters within he container 12.

Figure 2:
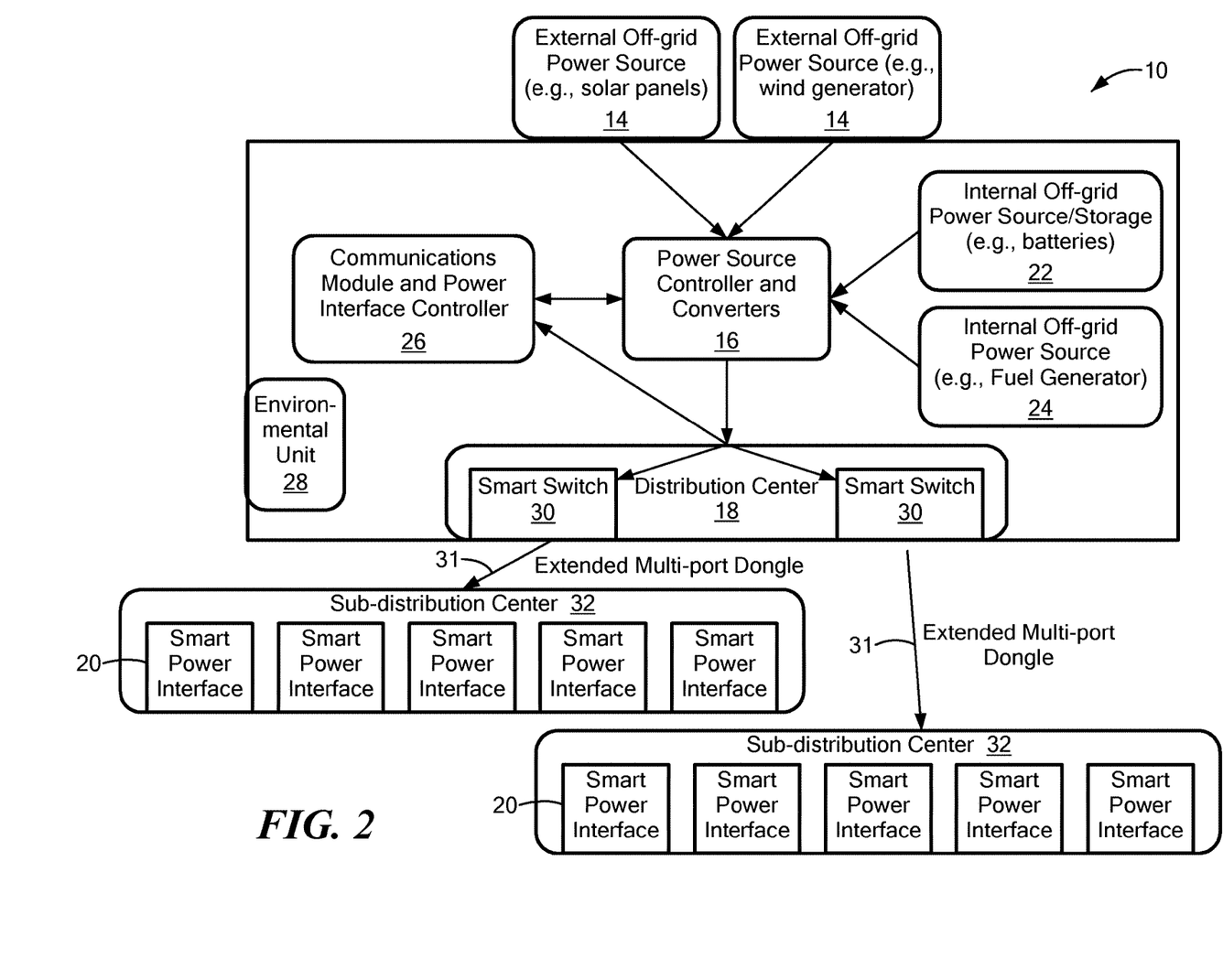
FIG. 2 is the block diagram shown in FIG. 1 including a plurality of power interfaces remote from the container.
Figure 3:
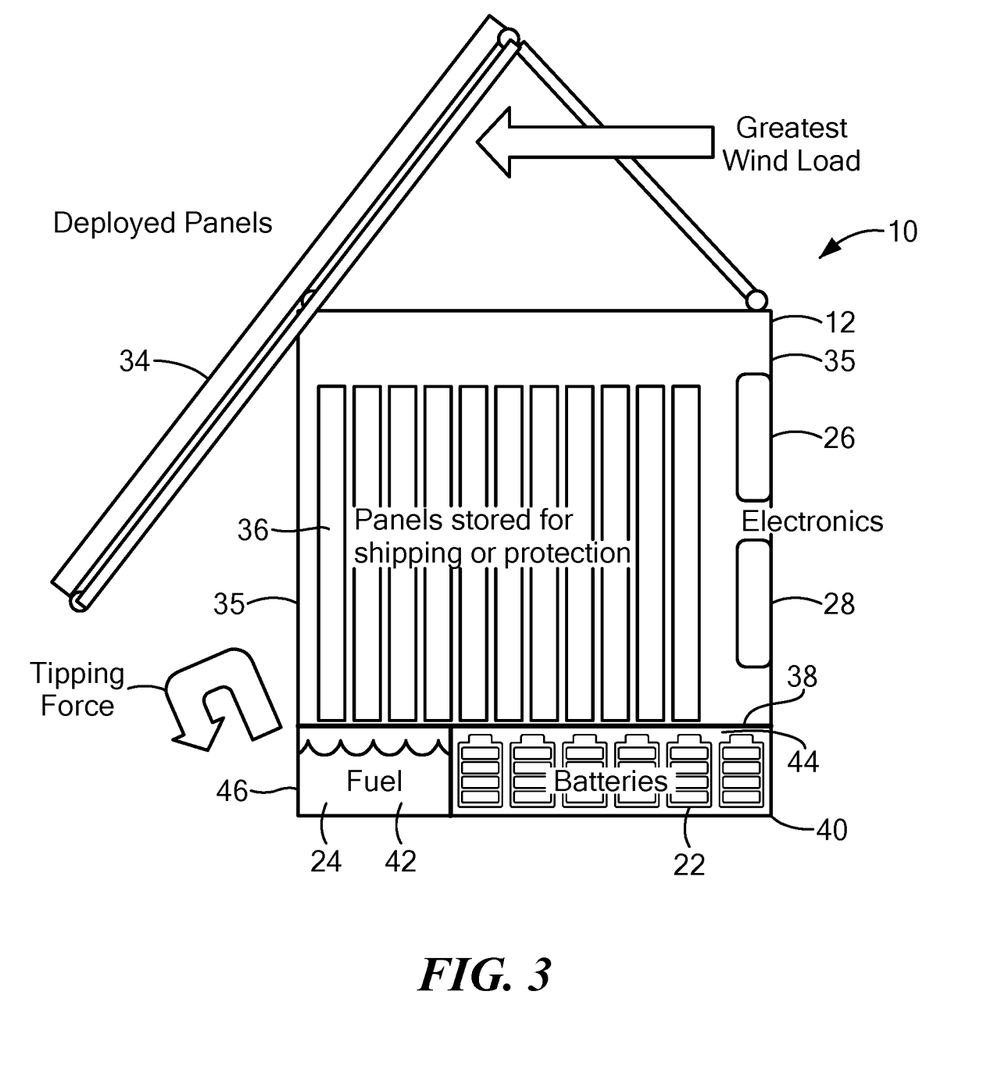
FIG. 3 is a side cross-sectional view of the container shown in FIG. 1 showing the various components of the power generation source and distribution system in a stacked and deployed configuration.
Figure 4:
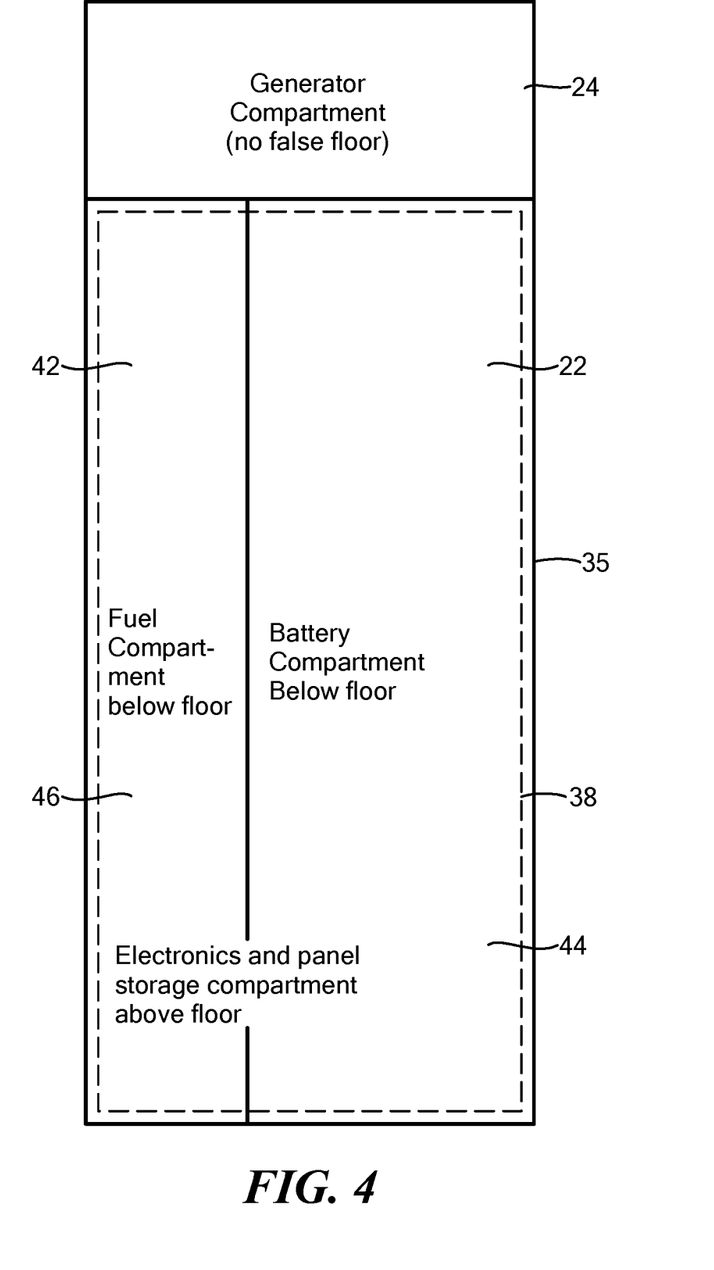
FIG. 4 is a top view of inside of the container shown in FIG. 3.
Figure 5:
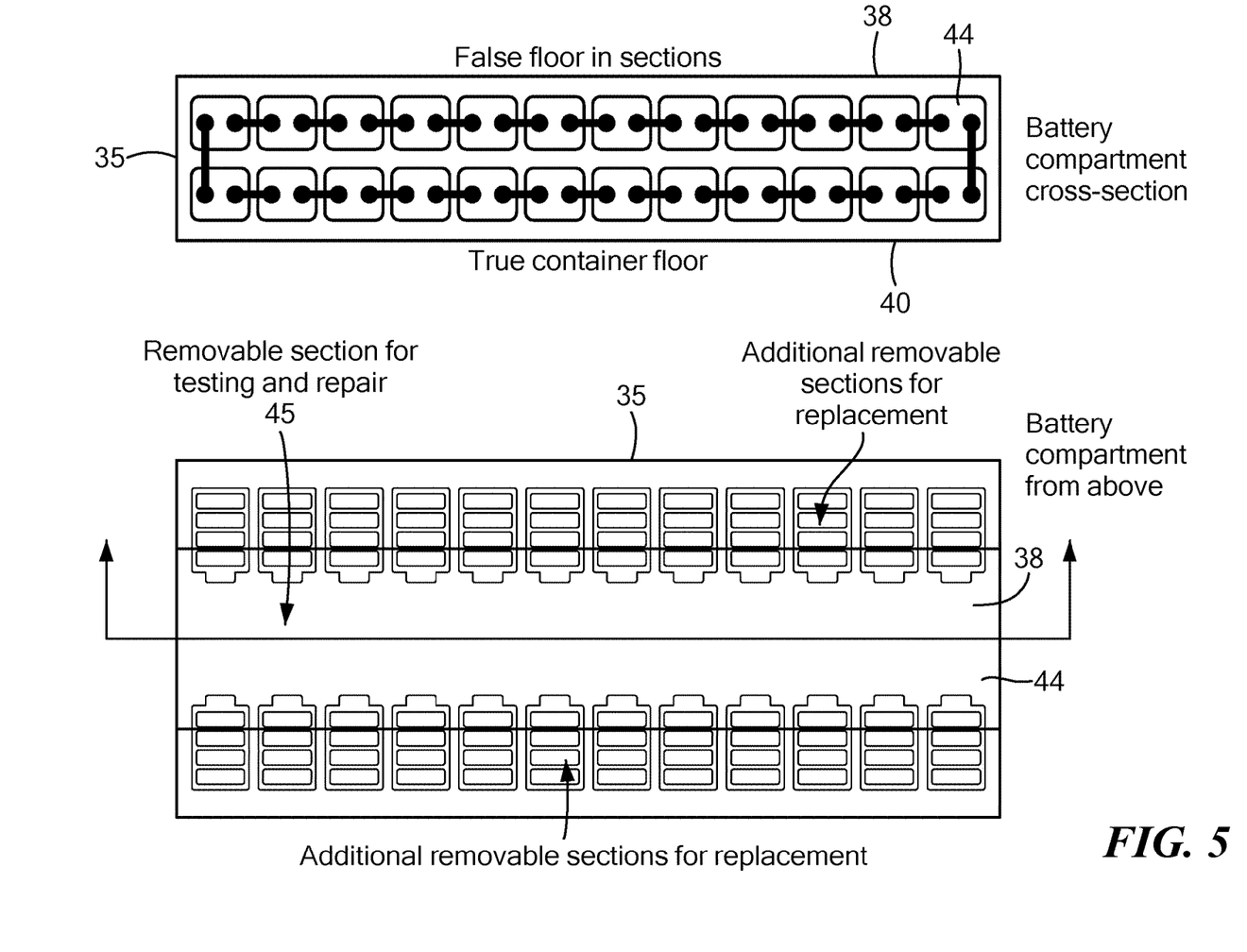
FIG. 5 is a side-view of the batteries shown in FIG. 1 stacked within the container.

Referring now to FIG. 2, in another configuration, the distribution center 18 may include at least one smart switch 30 configured to distribute power to at least one sub-distribution center 32 disposed at a location remote from the container 12. The smart switch 30 is configured to be in communication with each of the smart power interfaces 20 associated with respective sub-distribution center 32 and operate as breakers to turn on/off power based one on or more predetermined parameters. In one configuration, each sub-distribution center 32 includes a dongle having multiple smart power interfaces 20 and is connected to its respective smart switch 30 by a cable 31, which may be buried underground to prevent power theft. For example, the cable 31 may electrically connect the container 12 to a sub-distribution center 32 above ground, for example, in someone's home. The smart switch 30 is configured to detect a power drain should power be siphoned or otherwise drained from the cable 31, or by some other method, and not from the authorized smart power interfaces 20 from the sub-distribution center 32, and turn off power to the smart power interface. The smart switch 30 is also configured to turn on and off power to one or more smart power interfaces 20 based on the available power in the battery 22, the time of the day, the energy load on the system 10, or other predetermined parameters Referring now to FIGS. 3-5, the system 10 may further be configured such that the various loads of each component are balanced to prevent the container 12 from tipping when the power sources 14 are deployed. Accordingly, the system 10 is designed with a ballasting system, such that the system 10 may be deployed in adverse weather conditions. For example, as shown in FIG. 3, when the components of the system 10 are arranged and disposed within the container 12 to balance the load created by, for example, deployed solar panels 34. Before being deployed, un-deployed solar panels 36 are stacked along one or more of the plurality of side walls 35. In the configuration shown in FIG. 3, the solar panels extend lengthwise along the container 12 with other electrical components, such as, but not limited to, the communication system 26 and the environmental control unit 28 being mounted on one or more of the sidewalls 36. To balance the loads created when the panels 34 are deployed, the container 12 is configured with a false floor 38, spaced apart from the container floor 40, to house the battery 22, which may include several batteries and battery cells, and fuel 42 for the generator 24. In particular, batteries are advantageous to use as ballast against tipping because of the density and total weight of the battery system. Oftentimes, batteries contain lead or other high-density metals and a battery system may weight several thousand pounds. For example, as shown in FIGS. 4 and 5, the batteries 22 may be mounted within the container 12 and deployed within and around a first compartment 44 defined by the plurality of side walls 35, the container floor 40, and the false floor 38. The first compartment 44 may further include one or more removable sections 45 (FIG. 5) defined by the false floor 38, which provide access to the batteries 22 for maintenance and repair. The un-deployed panels 36 and the electronic components are coupled to the container 12 above the false floor 38. The fuel 42 may be disposed in a second compartment 46 defined by the false floor 38 and the container floor 40 adjacent and opposite the first compartment 44. The generator 24 may be disposed adjacent both the first compartment 44 and the second compartment 46 on the container floor 40 with no false floor present. Such an arrangement provides ballast to the container 12 to prevent tipping.

In an exemplary configuration, the deployed panels 34 operate as the power source 14 for the system 10 and are deployed at an angle with respect to the container 12 on one of the plurality of sidewalls 36 of the container 12. Such a configuration creates a large wind load when wind is blowing in the direction of the panels, as shown in FIG. 3. This also causes a tipping force in the direction indicated by the arrow in FIG. 3. To counteract the tipping force, the batteries 22 are disposed within the first compartment 44, which is on the opposite side of the deployed panels 34. The weight of the batteries 22 counteracts the tipping forces of the deployed panels and the fuel 42 such that the container 12 is stable even in high wind conditions.

Figure 6:
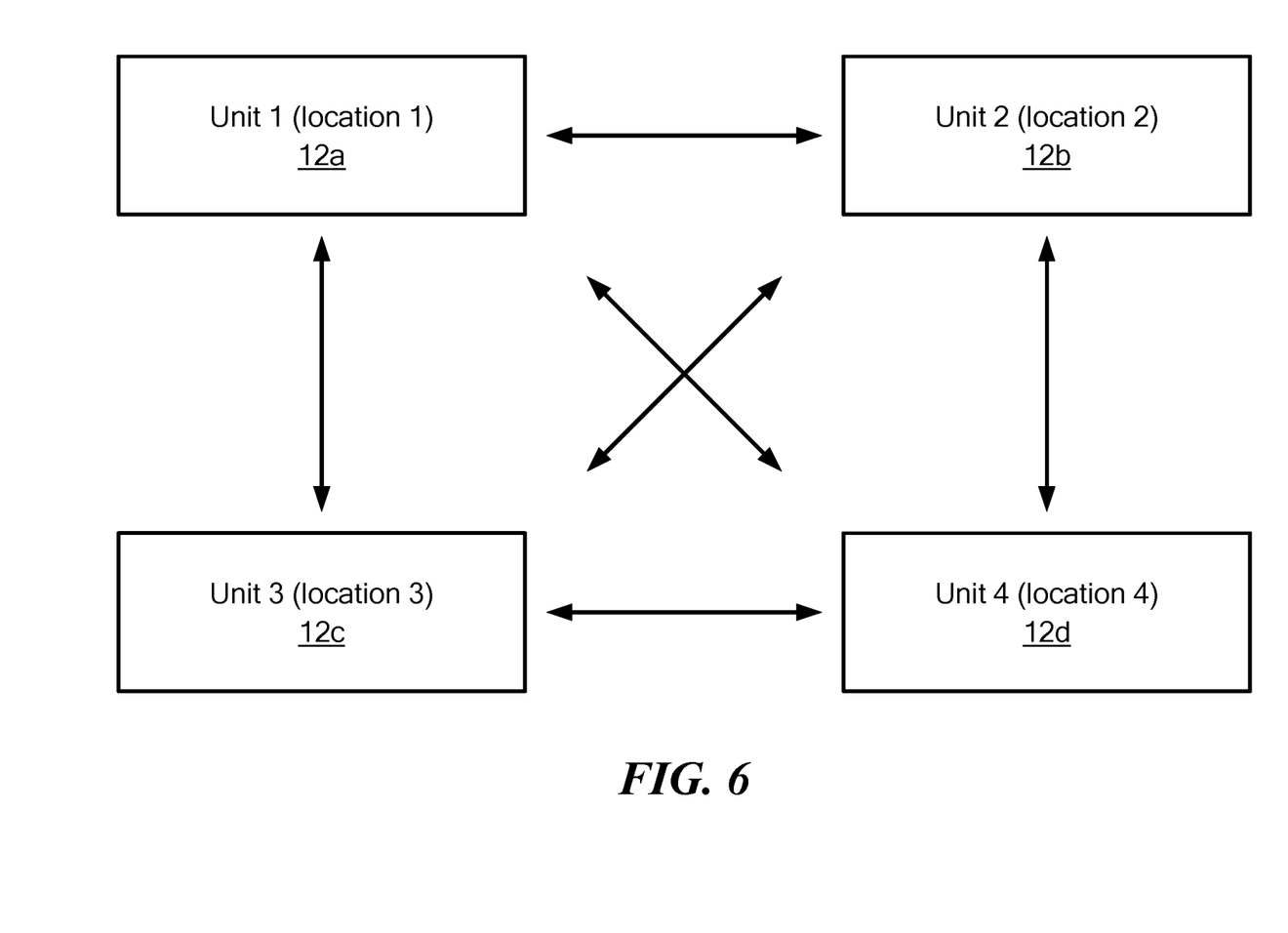
FIG. 6 is a block diagram showing multiple power generation source and distribution systems in communication with each other.

Referring now to FIG. 6, multiple devices 10 may be deployed in a target area, for example, a disaster area, to provide power to various municipal buildings such as schools, hospitals, and fire departments, as well as commercial and residential establishments that require power. In the configuration shown in FIG. 6, four containers 12a-12d containing respective systems 10, which may be constructed in any of the embodiments disclosed herein, may be deployed at different locations while being in communication with each and every other container 12. The containers 12a-12d would be configured to form a mobile ad hoc communications network and transmit both voice and data through said system without the requirement of an external central communications system, as each container 12a-12d would have its own power source and independent communication system 26. Thus, container 12a would be able to monitor conditions container 12d and every other container 12. Similarly, a person at container 12a would be able to talk to another person at container 12d and every other container 12.

Figure 7A:
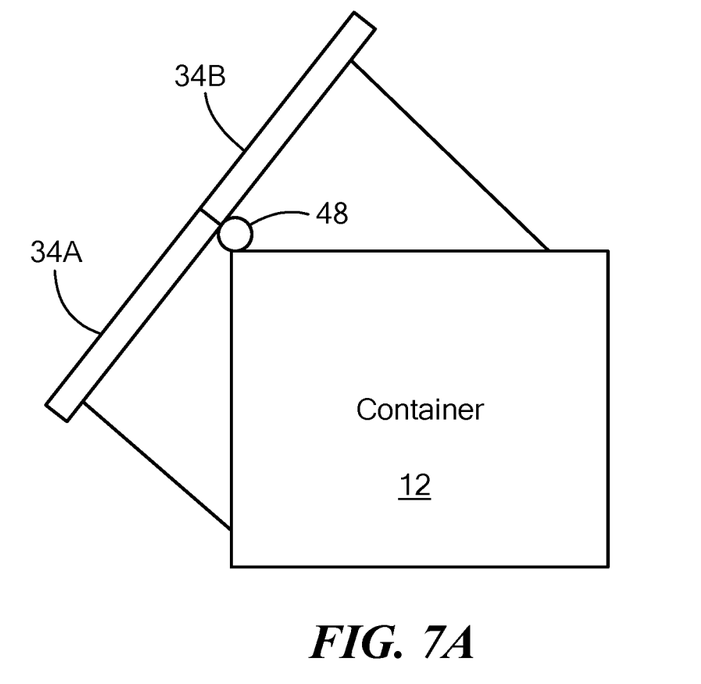
FIG. 7A is a side view of the container shown in FIG. 3 with solar panels fully deployed.
Figure 7B:
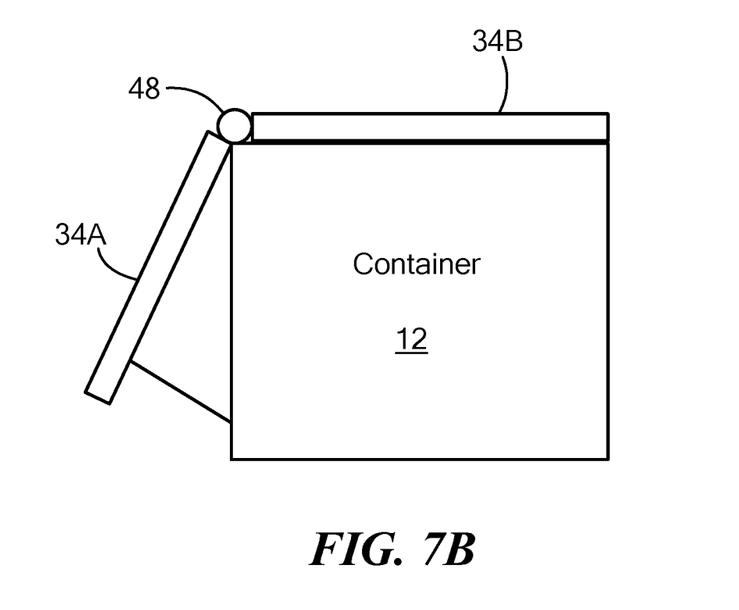
FIG. 7B is a side view of the container shown in FIG. 7A with solar panels partially deployed.

Referring now to FIGS. 7A and 7B which illustrate deployed panels 34A and 34B in a fully deployed configuration (FIG. 7A) and partially deployed configurations (FIG. 7B). In the configuration shown in FIG. 7A, panels 34A and 34B are aligned in a co-planar manner and deployed at angle with respect to container 12 as discussed above. Such a configuration may be used in variable weather conditions, for example, low wind conditions which may cause a small tipping force on the container. In one configuration, if wind speeds should increase beyond a predetermined threshold, for example, during a tropical storm, the container 12 may be configurable such that only panels 34A are fully deployed, whereas panels 34B are in a partially deployed state superjacent and parallel to a top surface of the container 12, as shown in FIG. 7B. In another configuration, panels 34A and 34B are deployed in a parallel manner but side-by-side to reduce wind load on the container 12, but still generating power. In yet another configuration panels 34A and 34B are brought parallel to the front and the top of the container respectively, in order to maximally reduce the wind load and still maintain some power production. For example, as shown in FIGS. 7A and 7B, a hinge 48 is included between the panels which enables the user to transition the panels 34A and 34B between a fully deployed (FIG. 7A) and various partially deployed (FIG. 7B) configuration. The panels 34A and 34B may be transitionable manually by the user or automatically by a motorized mechanism triggerable by a remote or internal signal.

Figure 8A:
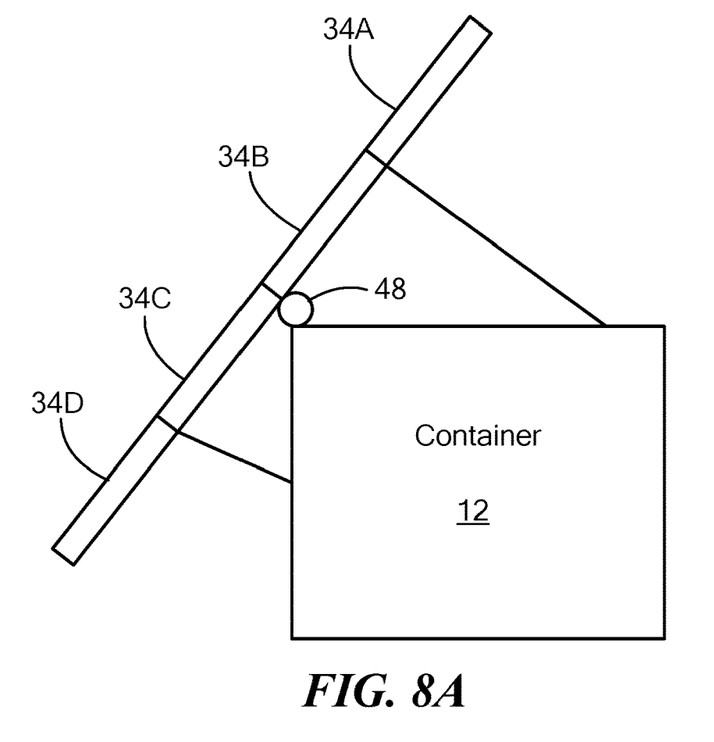
FIG. 8A is a side view of the container shown in FIG. 3 with another configuration of solar panels fully deployed.
Figure 8B:
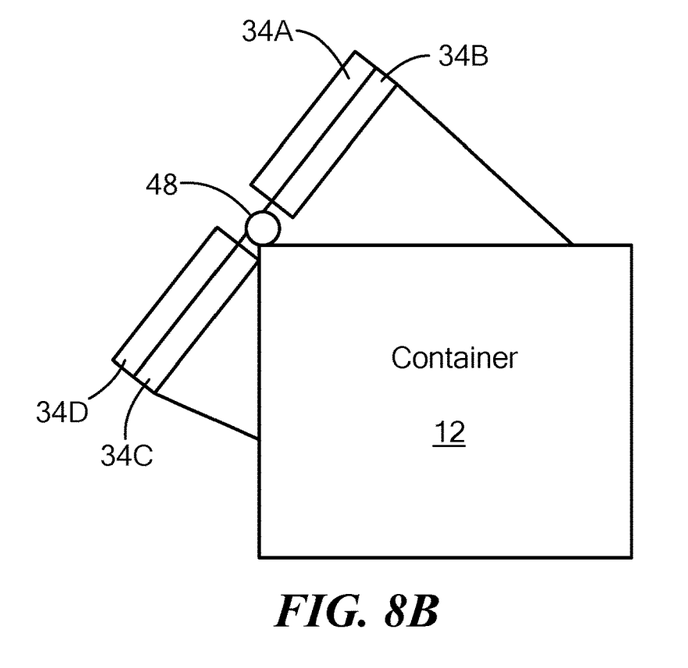
FIG. 8B is a side view of the container shown in FIG. 8A with solar panels partially deployed.

Referring now to FIGS. 8A and 8B which illustrate deployed panels 34A, 34B, 34C, and 34D in a fully deployed configuration (FIG. 8A) and partially deployed configurations (FIG. 8B). In the configuration shown in FIG. 8A, four panels 34 are aligned in a co-planar manner to maximize power generation, but also increase potential wind load on the container 12. Thus, the configuration shown in FIG. 8A may be typically deployed in low wind conditions, for example, after a severe weather event such as a hurricane. In the configuration shown in FIG. 8B, panels 34A and 34B are stacked on top of each other in a parallel configuration and panels 34C and 34D are similar stacked adjacent to panels 34A and 34B in a parallel configuration. Although shown in a symmetric deployment in FIG. 8B, it is contemplated that panels 34A-D may be deployed or partially deployed in any configuration.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A renewable-energy electrical generation and distribution system, comprising:
    a first container;

at least one power source sized to be retained within the first container and deployable therefrom, the at least one power source being configured to generate energy from renewable resources, the at least one power source including a plurality of solar panels, the plurality of solar panels configured to be deployed at an angle with respect to the first container on a first sidewall of the first container;

the first container further defining a first compartment and a second compartment, a set of batteries being retained within the first compartment and spaced evenly within and around the first compartment, the set of batteries being positioned proximate a bottom of the first container and on an opposite side of the first container from the first sidewall to ballast the first container against tipping due to wind, and a fuel-based generator being retained within the second compartment, the first compartment and the second compartment having independent environmental parameters for temperature control and being independently controlled by an environmental control unit;

the set of batteries being in communication with the at least one power source;

a power distribution system disposed within the first container and in communication with the set of batteries and the at least one power source, the power distribution system including:
  at least one smart switch; and
  at least one smart power interface connected to the at least one smart switch and disposed external to the first container, the at least one smart switch configured selectively turn on and off power distribution to the at least one smart power interface based on at least one predetermined parameter;

a power source controller disposed within the first container and configured to monitor and control energy absorption from the at least one power source, energy storage in the set of batteries, and energy delivery to the power distribution system;

the environmental control unit disposed within the first container and in communication with an ambient environment external to the first container, the environmental control unit being configured to monitor and control a predetermined environmental condition within the first container; and the power source controller being configured to measure temperature within the first container and prioritize power to one of the power distribution system and the environmental control unit based on the measured temperature.

2. The system of claim 1, wherein the first container further includes a plurality of internal side walls, a container floor, and a false floor superjacent to the container floor, and wherein the plurality of internal side walls, the container floor, and the false floor define the first compartment and the second compartment, the second compartment being adjacent the first compartment, and wherein fuel for a non-renewable fuel-based electrical generator is retained within the second compartment.

3. The system of claim 1, where the environmental control unit includes one of a heating element and a cooling element, and wherein the power source controller is configured to monitor a temperature within the first container and activate heating or cooling to maintain a predetermined temperature for battery performance.

4. The system of claim 1, further including a communications system disposed within the first container and configured to communicate data and voice information via an ad-hoc mobile communications network, the ad-hoc mobile communications network formed by a plurality of similar containers including the first container, the ad-hoc mobile communications network being configured to operate independent of any communication network not part of the plurality of similar containers forming the ad-hoc mobile communications network.

5. The system of claim 1, further including a sub-distribution system in communication with the power distribution system, the sub-distribution system being remote from the first container and electrically coupled to the distribution system by a tamper-resistant cable and by a first smart switch of the at least one smart switch, the first smart switch configured to:
  detect an unauthorized power drain and turn off power to at least one smart power interface in response to detecting the unauthorized power drain; and
  toggle power to the at least one smart power interface based on at least one of a measurement of available power in the set of batteries, a time of day, and an energy load on the renewable-energy electrical generation and distribution system.

6. A renewable-energy electrical generation and distribution system, comprising:
  a first container;
  at least one power source sized to be retained within the first container and deployable therefrom, the at least one power source being configured to generate energy from renewable resources;
  a set of batteries disposed within the first container and in communication with the at least one power source;
  a power distribution system disposed within the first container and in communication with the set of batteries and the at least one power source, the power distribution system including:
    at least one smart switch;
    and at least one smart power interface connected to the at least one smart switch and disposed external to the first container, the at least one smart switch configured selectively turn on and off power distribution to the at least one smart power interface based on at least one predetermined parameter;
  a power source controller disposed within the first container and configured to monitor and control energy absorption from the at least one power source, energy storage in the set of batteries, and energy delivery to the power distribution system;
  an environmental control unit disposed within the first container and in communication with an ambient environment external to the first container, the environmental control unit being configured to monitor and control a predetermined environmental condition within the first container;
  the power source controller being configured to measure temperature within the first container and prioritize power to one of the power distribution system and the environmental control unit based on the measured temperature; and
  a sub-distribution system in communication with the power distribution system, the sub-distribution system being remote from the first container and electrically coupled to the power distribution system by a tamper-resistant cable and by a first smart switch of the at least one smart switch, the first smart switch configured to:

detect an unauthorized power drain and turn off power to at least one smart power interface in response to detecting the unauthorized power drain; and toggle power to the at least one smart power interface based on at least one of a measurement of available power in the set of batteries, a time of day, and an energy load on the renewable-energy electrical generation and distribution system.

7. The system of claim 6, the first container further including a false floor including at least one removable section.

8. The system of claim 6, wherein the at least one power source includes a plurality of solar panels mountable on an exterior of the first container.

9. The system of claim 8, wherein the plurality of solar panels is configured to be transitionable to a deployment angle that decreases wind loading.

10. The system of claim 6, where the environmental control unit includes one of a heating element and a cooling element, and wherein the power source controller is configured to monitor a temperature within the first container and activate heating or cooling to maintain a predetermined temperature for battery performance.

11. The system of claim 6, further including a communications system disposed within the first container and configured to communicate data and voice information via an ad-hoc mobile communications network, the ad-hoc mobile communications network formed by a plurality of similar containers including the first container, the ad-hoc mobile communications network being configured to operate independent of any communication network not part of the plurality of similar containers forming the ad-hoc mobile communication network.

12. The system of claim 1, wherein the first container is a shipping container.

13. The system of claim 6, wherein the first container is a shipping container.

14. The system of claim 6, wherein the plurality of solar panels is configured to be deployed at an angle with respect to the first container on a first sidewall of the first container.

15. The system of claim 14, the first container further defining a first compartment, the set of batteries being spaced evenly within and around the first compartment, the set of batteries being positioned proximate a bottom of the first container and positioned on an opposite side of the first container from the first sidewall to ballast the first container against tipping to due to wind.

16. A renewable-energy electrical generation and distribution system, comprising:
a first container;
at least one power source sized to be retained within the first container and deployable therefrom, the at least one power source being configured to generate energy from renewable resources;
a set of batteries disposed within the first container and in communication with the at least one power source,
a power distribution system disposed within the first container and in communication with the set of batteries and the at least one power source, the power distribution system including:
at least one smart switch; and
at least one smart power interface connected to the at least one smart switch and disposed external to the first container, the at least one smart switch configured selectively turn on and off power distribution to the at least one smart power interface based on at least one predetermined parameter;
a power source controller disposed within the first container and configured to monitor and control energy absorption from the at least one power source, energy storage in the set of batteries, and energy delivery to the power distribution system;
an environmental control unit disposed within the first container and in communication with an ambient environment external to the first container, the environmental control unit being configured to monitor and control a predetermined environmental condition within the first container; and
the power source controller being configured to measure temperature within the first container and prioritize power to one of the power distribution system and the environmental control unit based on the measured temperature; and
a communications system disposed within the first container and configured to communicate data and voice via an ad-hoc mobile communications network, the ad-hoc mobile communications network formed by a plurality of similar containers including the first container, the ad-hoc mobile communications network being configured to operate independent of any communication network not part of the plurality of similar containers forming the ad-hoc mobile communications network.

17. The system of claim 16, wherein the first container is a shipping container.

18. The system of claim 16, wherein the at least one renewable energy electrical generator source includes a plurality of solar panels, the plurality of solar panels being configured to be deployed at an angle with respect to the first container on a first sidewall of the first container.

19. The system of claim 18, the first container further defining a first compartment, the set of batteries being spaced evenly within and around the first compartment, the set of batteries being positioned proximate a bottom of the first container and positioned on an opposite side of the first container from the first sidewall to ballast the first container against tipping to due to wind.

* * * * *